(12) United States Patent
Watanabe et al.

(10) Patent No.: US 12,286,054 B2
(45) Date of Patent: Apr. 29, 2025

(54) VEHICLE LAMP APPARATUS

(71) Applicant: Koito Manufacturing Co., Ltd., Tokyo (JP)

(72) Inventors: Shigeyuki Watanabe, Shizuoka (JP); Hirohiko Oshio, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 18/675,498

(22) Filed: May 28, 2024

(65) Prior Publication Data
US 2024/0308418 A1 Sep. 19, 2024

Related U.S. Application Data

(63) Continuation of application No. PCT/JP2022/042447, filed on Nov. 15, 2022.

(30) Foreign Application Priority Data

Nov. 30, 2021 (JP) .................................. 2021-194203

(51) Int. Cl.
*B60Q 1/28* (2006.01)
*F21S 43/00* (2018.01)

(52) U.S. Cl.
CPC .............. *B60Q 1/28* (2013.01); *F21S 43/601* (2024.05); *B60Q 2400/50* (2013.01)

(58) Field of Classification Search
CPC ..... B60Q 1/28; B60Q 2400/50; F21S 43/601; G01M 11/06
See application file for complete search history.

(56) References Cited

U.S. PATENT DOCUMENTS 10,890,309 B1 * 1/2021 Servantie ............. G01M 11/064
2018/0290583 A1 * 10/2018 Park ..................... G01M 11/064

FOREIGN PATENT DOCUMENTS

| JP | 2007298286 A | 11/2007 |
|----|--------------|---------|
| JP | 2010018217 A | 1/2010  |
| JP | 2017056828 A | 3/2017  |
| JP | 2017067656 A | 4/2017  |

OTHER PUBLICATIONS

International Preliminary Report on Patentability Chapter I (PCT/IB/373) with translation mailed on May 2, 2024 by The International Bureau of WIPO in corresponding International Patent Application No. PCT/JP2022/042447. (8 pages).
International Search Report (PCT/ISA/210) with translation mailed on Jan. 17, 2023 by the Japan Patent Office as the International Searching Authority for International Application No. PCT/JP2022/042447. (6 pages).

* cited by examiner

*Primary Examiner* — Thomas M Sember
(74) *Attorney, Agent, or Firm* — BUCHANAN, INGERSOLL & ROONEY PC

(57) ABSTRACT

A vehicle lamp apparatus has an adaptive driving beam lamp unit, and a controller. The adaptive driving beam lamp unit contains a plurality of individually controllable pixels, and is structured to emit a lamp beam with a light distribution that corresponds to states of the pixels. The controller is structured to control the light distribution of the adaptive driving beam lamp unit. The vehicle lamp apparatus can form an aiming light distribution in an aiming mode. The aiming light distribution contains a cross pattern whose cross point falls on a position that corresponds to an elbow point of a low-beam light distribution.

3 Claims, 3 Drawing Sheets

VEHICLE LAMP APPARATUS

BACKGROUND

1. Technical Field

The present disclosure relates to a vehicle lamp apparatus.

2. Description of the Related Art

Light distribution pattern of vehicle headlamp is regulated by law, so as not to cause glare to a nearby traffic participant. For example, the light distribution of low beam is defined by an elbow point and a cut-off line that passes therethrough.

The headlamp needs to be adjusted for its optical axis, in a car manufacturing or inspection process, or in car maintenance. This optical axis adjustment is referred to as aiming. More specifically, the optical axis of the headlamp is adjusted so as to place the elbow point at a predetermined position on a screen.

Prior aiming has adjusted the position of the elbow point, with the low beam kept turned on. The light distribution of low beam, however, actually has an ambiguous cut-off line, which therefore blurs the elbow point. This has made the aiming difficult.

SUMMARY

The present disclosure has been arrived in such circumstances, and one of exemplary purposes thereof is to provide a vehicle lamp apparatus that can facilitate the aiming.

One mode of the present disclosure relates to a vehicle lamp apparatus. The vehicle lamp apparatus has an adaptive driving beam lamp that contains a plurality of individually controllable pixels, and is structured to emit a lamp beam with a light distribution that corresponds to states of the pixels; and a controller structured to control the light distribution of the adaptive driving beam lamp. The vehicle lamp apparatus is structured to form an aiming light distribution that contains a cross pattern whose cross point falls on a position that corresponds to an elbow point of a low-beam light distribution.

Note that also free combinations of these constituents, and also any of the constituents and expressions exchanged among the method, apparatus, and system, are valid as the modes of the present disclosure. Furthermore, the description of this section (SUMMARY) does not describe all essential features of the invention, and thus subcombinations of these features described may also be the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Outline of Embodiments

Figure 1:
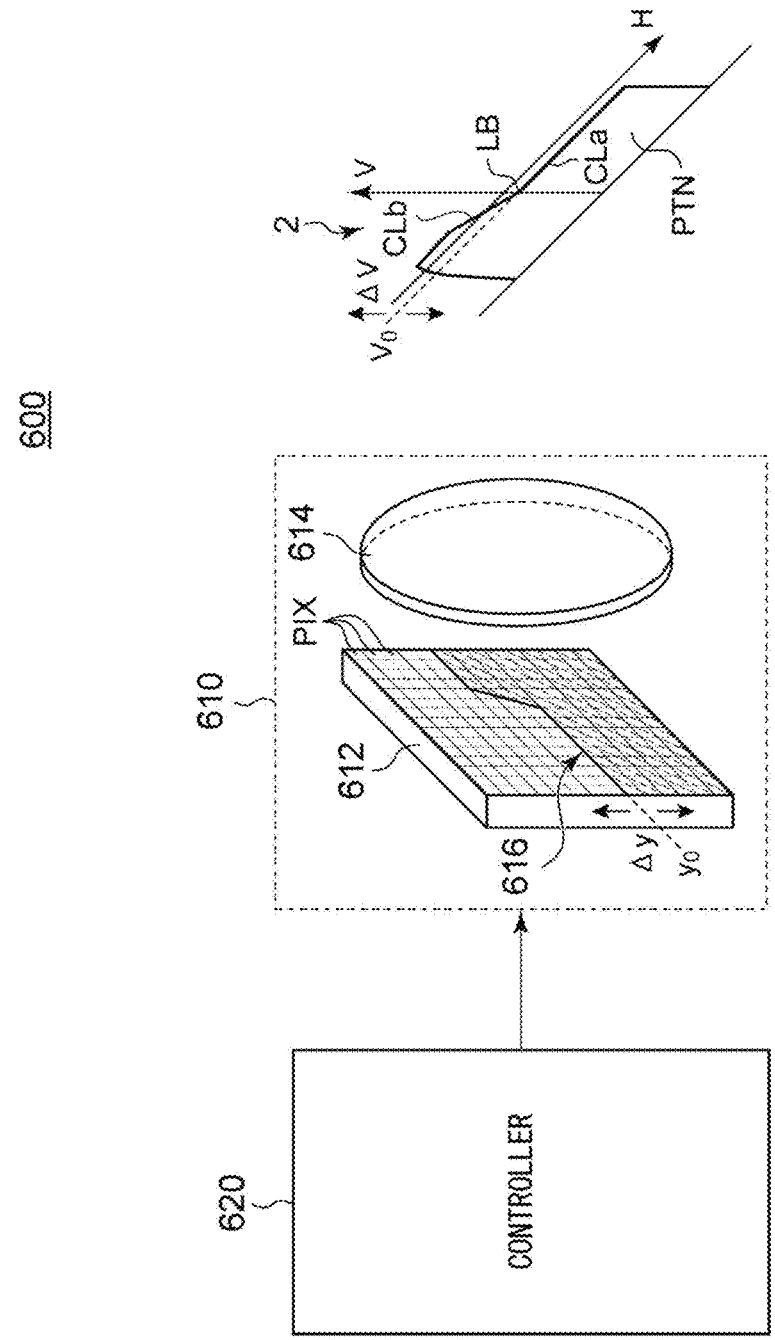
FIG. 1 is a block diagram illustrating a vehicle lamp apparatus according to an embodiment.

Some exemplary embodiments of the present disclosure will be outlined. This outline will provide introduction into the detailed description that follows, and will brief some concepts of one or more embodiments for basic understanding thereof, without limiting the scope of the invention or disclosure. Also note this summary is not a comprehensive overview of all possible embodiments, and thus does not limit the essential components of the embodiments. For convenience, the term "one embodiment" may be used to designate one embodiment (Example or Modified Example), or a plurality of embodiments (Examples or Modified Examples) disclosed in the present specification.

The vehicle lamp apparatus according to one embodiment has an adaptive driving beam lamp that contains a plurality of individually controllable pixels, and is structured to emit a lamp beam with a light distribution that corresponds to states of the pixels; and a controller structured to control the light distribution of the adaptive driving beam lamp. The vehicle lamp apparatus is structured to form an aiming light distribution that contains a cross pattern whose cross point falls on a position that corresponds to an elbow point of a low-beam light distribution.

This structure enables aiming while assuming the cross point of the cross pattern as the elbow point. The cross pattern, having a higher contrast than an ordinary low-beam light distribution, is more recognizable. In addition, the vertical line of the cross pattern helps recognition of the horizontal position of the elbow point, and the horizontal line of the cross pattern helps recognition of the vertical position of the elbow point, thus facilitating the aiming.

In one embodiment, the cross pattern may contain two L-shaped patterns or two inverted L-shaped patterns, arranged point-symmetrically with respect to the position that corresponds to the elbow point. The elbow point in this case is recognizable as a point without width, and thus enables accurate aiming.

In one embodiment, the cross pattern may contain two straight-line patterns orthogonal to each other.

In one embodiment, the adaptive driving beam lamp may contain an array of light emitting elements.

In one embodiment, the adaptive driving beam lamp may contain a light source, and a spatial light modulator structured to pattern the emitted light from the light source.

Embodiments

Preferred embodiments will be explained below, referring to the attached drawings. All similar or equivalent constituents, members and processes illustrated in the individual drawings will be given same reference numerals, so as to properly avoid redundant explanations. The embodiments are merely illustrative, and are not restrictive about the disclosure. All features and combinations thereof described in the embodiments are not always essential to the disclosure.

In the present specification, a "state in which a member A is coupled to a member B" includes a case where the member A and the member B are physically and directly coupled, and a case where the member A and the member B are indirectly coupled while placing in between some other member that does not substantially affect the electrically coupled state, or does not degrade the function or effect demonstrated by the coupling thereof.

Similarly, a "state in which member C is provided between member A and member B" includes a case where the member A and the member C, or the member B and the member C are directly connected, and a case where they are indirectly connected, while placing in between some other member that does not substantially affect the electrical connection state among the members, or does not degrade the function or effect demonstrated by the members.

FIG. 1 is a block diagram illustrating a vehicle lamp apparatus 600 according to an embodiment. The vehicle lamp apparatus 600 is a headlamp that is mounted on an automobile, which is structured to illuminate a field of view ahead of the vehicle with light. The vehicle lamp apparatus 600 has an adaptive driving beam lamp unit 610, and a controller 620.

In this embodiment, the adaptive driving beam lamp unit 610 is structured to illuminate a part of, or the entire of a low-beam region with light. The adaptive driving beam lamp unit 610 contains a plurality of individually controllable pixels PIX, and is structured to emit a lamp beam with a light distribution that corresponds to states of the pixels PIX. The adaptive driving beam lamp unit 610 typically contains a light emitting element array 612, and an illumination optical system 614. The light emitting element array 612 usable here may be an LED array.

Luminance of each pixel PIX may be controlled in two gradations of ON and OFF, or may be controlled in multiple gradations. The pixels, when structured to be controllable in two gradations of ON and OFF, may alternatively be expressed in multiple gradations with the aid of PWM dimming, by which the individual pixels PIX are switched at high speed, while varying the temporal ratio (duty cycle) between the on-time and the off-time.

The illumination optical system 614 projects an output light from the light emitting element array 612, to the front of the vehicle. The illumination optical system 614 may be a lens optical system, a reflection optical system, or a combination thereof.

FIG. 1 illustrates a virtual perpendicular screen 2. The virtual perpendicular screen 2 is assumed to be a coordinate system with reference to the road face. The virtual perpendicular screen 2 may be 10 m, or 25 m away from the vehicle (lamp). On the virtual perpendicular screen 2, a light distribution pattern PTN is created with the lamp beam of the adaptive driving beam lamp unit 610. The light distribution pattern PTN is an intensity distribution of the lamp beam seen on the virtual perpendicular screen 2, which corresponds to an on/off pattern of the plurality of pixels PIX of the light emitting element array 612. Note that the correspondence between the position of a certain pixel, with an illumination area on the virtual perpendicular screen 2 ascribed to the pixel, is determined by the illumination optical system 614, and may be occasionally given in a mirror image relation (left-right inversion), up-down inversion, or up-down and left-right inversion.

The light distribution pattern PTN contains a cut-off line CL. In this example, the light distribution pattern PTN contains a horizontal cut-off line CLa and an oblique cut-off line CLb, which intersect at an elbow point LB.

The controller 620 is structured to control the adaptive driving beam lamp unit 610 according to a traveling scene, so as to control the light distribution of the low beam. The controller 620 allows the adaptive driving beam lamp unit 610 function as an ADB, if the adaptive driving beam lamp unit 610 also covers the high beam region.

The function of the controller 620 may be embodied by software processing, hardware processing, or a combination of software processing and hardware processing. The software processing may be specifically implemented by combining a processor (hardware) such as central processing unit (CPU), micro processing unit (MPU), or microcontroller, with software program executed by the processor (hardware). The controller 620 may also be embodied by combination of a plurality of processors (microcontrollers).

The hardware processing is specifically implemented by hardware such as application specific integrated circuit (ASIC), controller IC, or field programmable gate array (FPGA).

The vehicle lamp apparatus 600 needs to be adjusted for its optical axis (aiming), in a car manufacturing or inspection process, or in car maintenance. More specifically, the optical axis of the headlamp is adjusted so as to place the elbow point LB at a predetermined position on the screen.

Figure 2A:
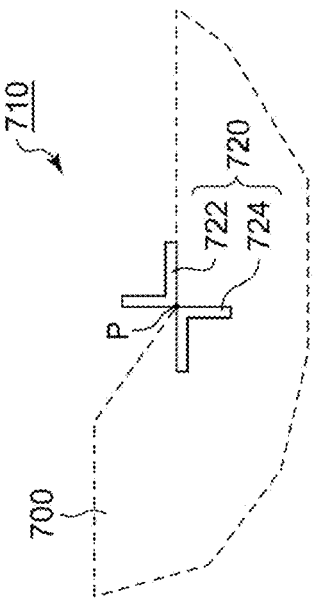
FIGS. 2A and 2B are drawings illustrating a low-beam light distribution and an aiming light distribution, respectively.
Figure 2B:
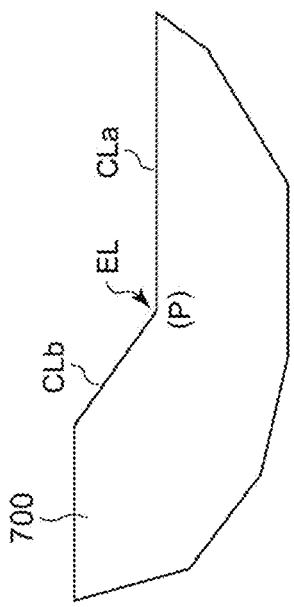

The prior aiming has been implemented while creating a low-beam light distribution. In contrast, the vehicle lamp apparatus 600 can create an aiming light distribution different from the low-beam light distribution. FIGS. 2A and 2B are drawings illustrating a low-beam light distribution and an aiming light distribution, respectively.

As illustrated in FIG. 2A, a low-beam light distribution 700 has a horizontal cut-off line CLa and an oblique cut-off line CLb, with the illuminance above the cut-off lines CLa and CLb defined substantially zero. The cut-off lines CLa and CLb intersect at the elbow point EL.

As illustrated in FIG. 2B, an aiming light distribution 710 contains a cross pattern 720 whose cross point falls on a position P that corresponds to the elbow point EL of the low-beam light distribution 700. The cross pattern 720 contains a part that extends in the horizontal direction, and a part that extends in the vertical direction.

The cross pattern 720 preferably contains two inverted L-shaped patterns 722, 724. The inverted L-shaped patterns 722, 724 are arranged point-symmetrically with respect to the position P that corresponds to the elbow point. The cross pattern 720 may alternatively be a combination of two L-shaped patterns. That is, the cross pattern 720 of FIG. 2B may be inverted left and right.

Figure 3:
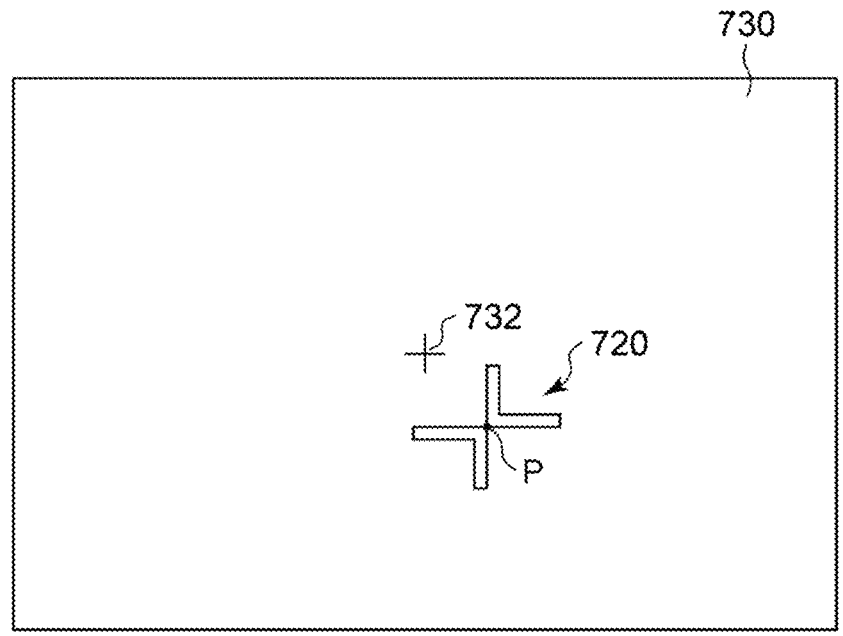
FIG. 3 is a drawing for explaining aiming.

The structure of the vehicle lamp apparatus 600 has been described. Next, aiming with the vehicle lamp apparatus 600 will be described. FIG. 3 is a drawing for explaining the aiming. FIG. 3 illustrates a screen 730 used for the aiming. The screen 730 has given thereon a target mark 732 that indicates a target position of the elbow point.

During the aiming, the vehicle that owns the vehicle lamp apparatus 600 is parked at a predetermined position faced to the screen 730. In this state, an aiming mode setting signal is transmitted to the controller 620. In response to the setting signal, the controller 620 sets the light distribution of the adaptive driving beam lamp unit 610 to the aiming light distribution 710. This causes the aiming light distribution 710 that contains the cross pattern 720 projected on the screen 730.

An aiming operator adjusts the optical axis of the vehicle lamp apparatus 600 so as to bring a center point P of the cross pattern 720 closer to the target mark 732. A method for adjusting the optical axis usually relies upon, but not specifically limited to, turning of a screw for optical axis adjustment.

The optical axis adjustment may alternatively rely upon an electronic process. As described above, the adaptive driving beam lamp unit 610 can freely create the light distribution according to ON and OFF of the plurality of pixels PIX. The controller 620 can shift the position of the center point P of the cross pattern 720 in the up, down, left, and right directions, upon controlled by the operator. The operator terminates the aiming after confirming that the center point P of the cross pattern 720 sufficiently approaches the target mark 732. The position of the center point P upon termination of the aiming is recorded in the controller 620. Upon being instructed to turn on the low beam, the controller 620 generates a control signal of the low-beam light distribution 700, so as to align the recorded position of the center point P to the elbow point.

Operations of the vehicle lamp apparatus 600 has been described. With such vehicle lamp apparatus 600, the operator can implement the aiming while assuming the cross point of the cross pattern 720 as the elbow point. The cross pattern 720 has a higher contrast than an ordinary low-beam light distribution, and is more recognizable. Furthermore, the horizontal position of the elbow point is recognizable by the vertical line of the cross pattern 720, and the vertical position of the elbow point is recognizable by the horizontal line of the cross pattern. This makes the aiming easier than in the case where the low-beam light distribution is projected on the screen.

MODIFIED EXAMPLES

It is to be understood by those skilled in the art that above-described embodiments are merely illustrative, and that combinations of the individual constituents or processes may be modified in various ways. Such modified examples will be explained below.

Modified Example 1

Figure 4:
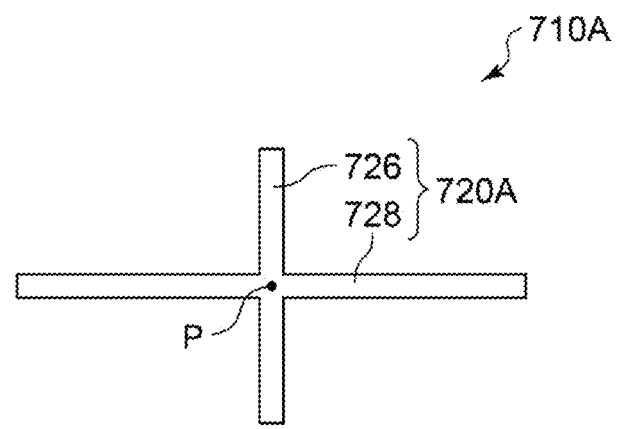
FIG. 4 is a drawing illustrating an aiming light distribution according to Modified Example 1.

FIG. 4 is a drawing illustrating an aiming light distribution 710A according to Modified Example 1. The aiming light distribution 710A contains a cross pattern 720A. The cross pattern 720A contains two straight-line patterns 726, 728 orthogonal to each other.

Also this pattern enables optical axis adjustment, with the center of the cross pattern 720A defined as a virtual elbow point.

Now, in the cross pattern 720A of FIG. 4, the existence position of the center point P has an ambiguity at the center point P, with a margin equivalent to the width of the two straight-line patterns 726, 728. Narrowing of the width of the straight-line patterns 726, 728 would solve the ambiguity, but would make the cross pattern 720A less recognizable if narrowed excessively.

In this regard, the cross pattern 720 of FIG. 2B can clearly define the center point P regardless of the width of the L-shaped patterns, and is thus considered to enhance accuracy of the aiming.

Modified Example 2

The aiming pattern may contain other patterns, besides the cross pattern. Alternatively in the aiming mode, the controller 620 may control the adaptive driving beam lamp unit 610 so as to alternately create the aiming light distribution and the low-beam light distribution in a time-division manner.

Modified Example 3

The embodiments have constituted the adaptive driving beam lamp unit 610 with the light emitting element array 612. The present disclosure is, however, not limited thereto. For example, the adaptive driving beam lamp unit 610 may contain a light source structured to generate a light with a substantially flat intensity distribution, and a spatial light modulator structured to spatially pattern the emitted light from the light source. The spatial light modulator is exemplified by digital micromirror device (DMD), and liquid crystal device.

Having described the present disclosure with use of specific terms referring to the embodiments, the embodiments merely illustrate the principle and applications of the present disclosure, allowing a variety of modifications and layout change without departing from the spirit of the present disclosure specified by the claims.

What is claimed is:

1. A vehicle lamp apparatus comprising:
    an adaptive driving beam lamp that contains a plurality of individually controllable pixels, and is structured to emit a lamp beam with a light distribution that corresponds to states of the pixels; and
    a controller structured to control the light distribution of the adaptive driving beam lamp, wherein
    the vehicle lamp apparatus is structured to form an aiming light distribution that contains a cross pattern whose cross point falls on a position that corresponds to an elbow point of a low-beam light distribution, and
    the cross pattern contains two L-shaped patterns or two inverted L-shaped patterns, arranged point-symmetrically with respect to the cross point, such that an intersection of respective outer corners of the two L-shaped patterns or two inverted L-shaped patterns coincides with the cross point, and the two L-shaped patterns or two inverted L-shaped patterns do not overlap outside the cross point.

2. The vehicle lamp apparatus according to claim 1, wherein the adaptive driving beam lamp contains an array of light emitting elements.

3. The vehicle lamp apparatus according to claim 1, wherein the adaptive driving beam lamp contains a light source and a spatial light modulator structured to pattern an emitted light from the light source.

* * * * *